US010829008B2

(12) United States Patent
Sasaki et al.

(10) Patent No.: US 10,829,008 B2
(45) Date of Patent: Nov. 10, 2020

(54) VEHICLE SEAT

(71) Applicant: NHK SPRING CO., LTD., Yokohama (JP)

(72) Inventors: Yoshitaka Sasaki, Yokohama (JP); Akira Honma, Yokohama (JP); Kenichi Katsube, Yokohama (JP); Daisuke Tanaka, Yokohama (JP); Shunichiro Osa, Yokohama (JP); Takuma Oki, Yokohama (JP)

(73) Assignee: NHK Spring Co., Ltd., Yokohama (JP)

( * ) Notice: Subject to any disclaimer, the term of this patent is extended or adjusted under 35 U.S.C. 154(b) by 0 days.

(21) Appl. No.: 16/366,926

(22) Filed: Mar. 27, 2019

(65) Prior Publication Data

US 2019/0299818 A1    Oct. 3, 2019

(30) Foreign Application Priority Data

Mar. 29, 2018    (JP) ................................ 2018-065111

(51) Int. Cl.

| B60N 2/04 | (2006.01) |
| B60N 2/06 | (2006.01) |
| B60N 2/10 | (2006.01) |
| B60N 2/16 | (2006.01) |
| B60N 2/18 | (2006.01) |
| B60N 2/20 | (2006.01) |

(Continued)

(52) U.S. Cl.
CPC ............. B60N 2/12 (2013.01); B60N 2/0232 (2013.01); B60N 2/68 (2013.01)

(58) Field of Classification Search
CPC ........... B60N 2/0232; B60N 2/12; B60N 2/68

USPC ... 297/216.1, 216.13, 216.14, 216.15, 284.3, 297/284.11, 312, 322, 341, 344.15, 297/344.16, 344.17

See application file for complete search history.

(56) References Cited

U.S. PATENT DOCUMENTS 3,550,953 A  * 12/1970 Neale ........................ B60N 2/62
                                                      297/312
3,883,173 A  *  5/1975 Shephard ................. B60N 2/62
                                                      297/312

(Continued)

FOREIGN PATENT DOCUMENTS

| DE | 4104440 A1 * 10/1991 ............... B60N 2/62 |
| JP | 58036732 A  *  3/1983 ............... B60N 2/62 |

(Continued)

*Primary Examiner* — Rodney B White
(74) *Attorney, Agent, or Firm* — Knobbe, Martens, Olson & Bear, LLP

(57) ABSTRACT

A vehicle seat that includes: a cushion frame rear portion that is rotatable around a rear portion shaft, whose axial direction is a seat transverse direction, with respect to a vehicle body floor portion; a cushion frame front portion that is connected to the cushion frame rear portion so as to be rotatable around a center fold shaft whose axial direction is the seat transverse direction and that is positioned further toward a seat front side than the rear portion shaft; a seatback frame that stands erect from a rear end side of the cushion frame rear portion; and a driving mechanism that moves the cushion frame front portion and the cushion frame rear portion relatively in a seat vertical direction between a non-reclining state and a reclining state, in which the cushion frame rear portion tilts downward and rearward with respect to the cushion frame front portion.

10 Claims, 13 Drawing Sheets

(51) Int. Cl.
   *B60N 2/68* (2006.01)
   *B60N 2/12* (2006.01)
   *B60N 2/02* (2006.01)

(56) References Cited

U.S. PATENT DOCUMENTS

| | | | | |
|---|---|---|---|---|
| 4,589,696 A * | 5/1986 | Kanai | ...................... | B60N 2/00 |
| | | | | 297/284.11 |
| 4,625,934 A * | 12/1986 | Ryan | ...................... | B64D 11/06 |
| | | | | 297/344.17 X |
| 4,636,002 A * | 1/1987 | Genjiro | ................ | B60N 2/0292 |
| | | | | 297/284.11 |
| 4,693,513 A * | 9/1987 | Heath | .................. | B60N 2/1839 |
| | | | | 297/284.11 |
| 4,709,961 A * | 12/1987 | Hill | ...................... | B60N 2/1839 |
| | | | | 297/284.11 |
| 4,753,479 A * | 6/1988 | Hatsutta | ............... | B60N 2/1842 |
| | | | | 297/284.11 |
| 4,775,185 A * | 10/1988 | Scholin | ................... | B60N 2/62 |
| | | | | 297/284.11 |
| 6,109,693 A * | 8/2000 | Bauer | .................. | B60N 2/0284 |
| | | | | 297/284.1 |
| 6,386,631 B1 * | 5/2002 | Masuda | ............... | B60N 2/4221 |
| | | | | 297/216.1 |
| 6,450,573 B1 * | 9/2002 | Yamaguchi | .......... | B60N 2/4221 |
| | | | | 297/216.1 |
| 6,648,409 B1 * | 11/2003 | Laporte | ................ | B60N 2/4221 |
| | | | | 297/216.1 |
| 6,739,658 B2 * | 5/2004 | Pedronno | ........... | B60N 2/42745 |
| | | | | 297/216.1 |
| 6,746,077 B2 * | 6/2004 | Klukowski | ........ | B60N 2/42763 |
| | | | | 297/216.1 |
| 6,811,219 B2 * | 11/2004 | Hudswell | ............ | B60N 2/3047 |
| | | | | 297/284.3 |
| 6,837,540 B2 * | 1/2005 | Yamaguchi | .......... | B60N 2/4221 |
| | | | | 297/216.1 |
| 6,921,133 B2 * | 7/2005 | Taoka | .................. | B60N 2/2803 |
| | | | | 297/216.11 |
| 6,966,598 B2 * | 11/2005 | Schmale | ................ | B60N 2/045 |
| | | | | 297/344.15 X |
| 7,140,682 B2 * | 11/2006 | Jaeger | .................. | B60N 2/0224 |
| | | | | 297/344.15 X |
| 7,156,457 B2 * | 1/2007 | Fujita | .................. | B60N 2/42763 |
| | | | | 297/216.1 |
| 7,404,602 B2 * | 7/2008 | Okada | .................. | B60N 2/0284 |
| | | | | 297/216.1 |
| 7,416,256 B2 * | 8/2008 | Fujita | ..................... | B60N 2/502 |
| | | | | 297/216.1 |
| 7,478,873 B2 * | 1/2009 | Al-Samarae | ......... | B60N 2/0232 |
| | | | | 297/216.1 |
| 7,533,936 B2 * | 5/2009 | Ujimoto | ................. | B60N 2/045 |
| | | | | 297/341 X |
| 7,669,929 B2 * | 3/2010 | Simon | .................. | B60N 2/0224 |
| | | | | 297/284.11 |
| 7,740,311 B2 * | 6/2010 | Taoka | .................. | B60N 2/4221 |
| | | | | 297/216.1 |
| 7,874,621 B2 * | 1/2011 | Gumbrich | ............ | B60N 2/0284 |
| | | | | 297/284.11 |
| 8,042,867 B2 * | 10/2011 | Meister | ................ | B64D 11/064 |
| | | | | 297/216.15 |
| 8,128,147 B1 * | 3/2012 | Kanda | .................. | B60N 2/1615 |
| | | | | 296/65.05 |
| 8,272,687 B2 * | 9/2012 | Gross | .................. | B60N 2/4221 |
| | | | | 297/216.1 |
| 8,366,194 B2 * | 2/2013 | Yamamoto | ........... | B60N 2/0232 |
| | | | | 297/284.11 |
| 8,888,181 B2 * | 11/2014 | Perraut | .................... | B60N 2/23 |
| | | | | 297/284.11 |
| 9,376,044 B2 * | 6/2016 | Fujita | ...................... | B60N 2/68 |
| 9,776,543 B2 * | 10/2017 | Line | .................. | B60N 2/7094 |
| 2001/0022460 A1 * | 9/2001 | Kondo | ................. | B60N 2/1839 |
| | | | | 297/284.11 |
| 2003/0178875 A1 * | 9/2003 | Ito | ........................ | B60N 2/1839 |
| | | | | 297/284.11 |
| 2004/0178667 A1 * | 9/2004 | Fujita | ....................... | B60N 2/68 |
| | | | | 297/216.1 |
| 2009/0230730 A1 * | 9/2009 | Ohtsubo | ................. | B60N 2/067 |
| | | | | 296/193.07 |
| 2015/0203011 A1 * | 7/2015 | Fujita | ....................... | B60N 2/22 |
| | | | | 297/284.11 |
| 2016/0144964 A1 * | 5/2016 | Braca | ................ | B64D 11/0641 |
| | | | | 297/284.3 X |

FOREIGN PATENT DOCUMENTS

| | | |
|---|---|---|
| JP | 2010-246599 A | 11/2010 |
| JP | 2017-019441 A | 1/2017 |

\* cited by examiner

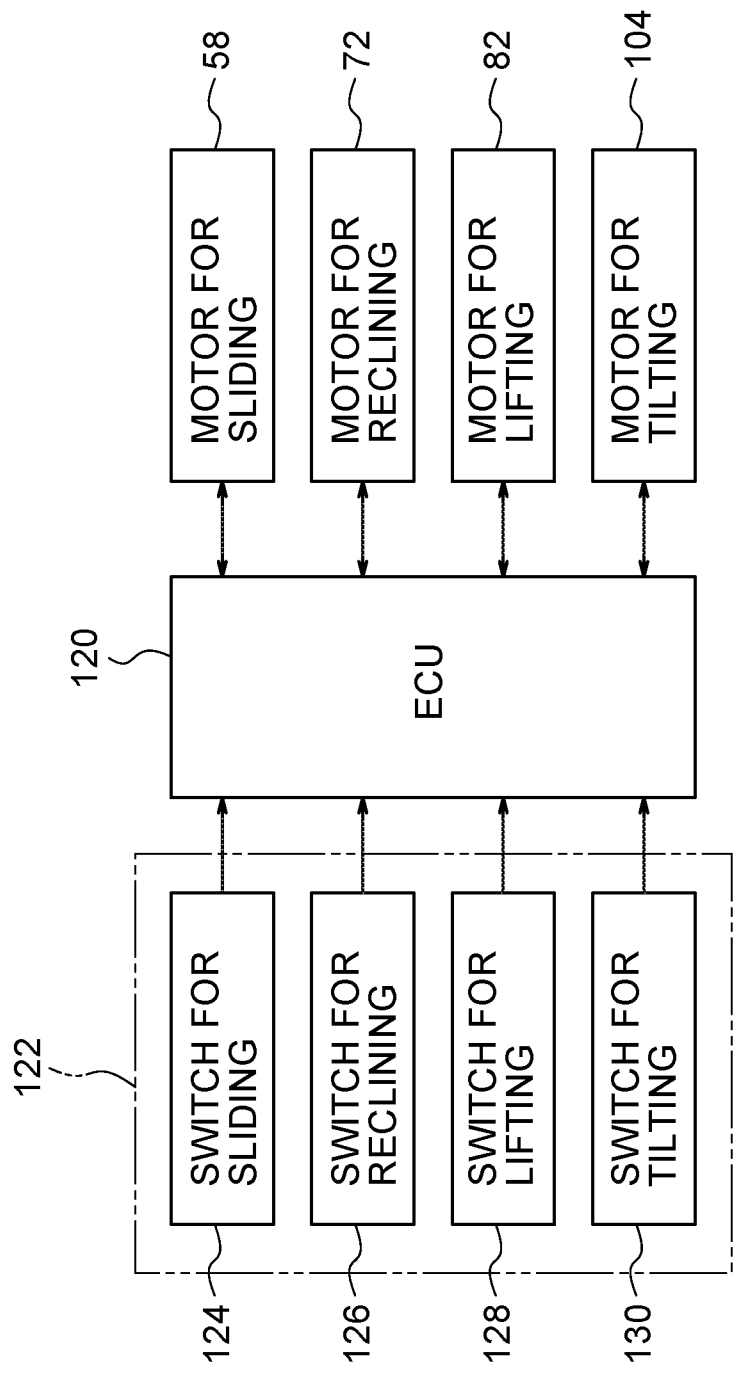

VEHICLE SEAT

BACKGROUND

Technical Field

The present disclosure relates to a vehicle seat.

Related Art

In the vehicle seat disclosed in Japanese Patent Application Laid-Open (JP-A) No. 2017-19441, a seatback frame is fixed to the rear end portion of a seat cushion frame so as to be unable to recline. This seat cushion frame is mounted to the vehicle body via a front side connecting mechanism and a rear side connecting mechanism. The front side connecting mechanism and the rear side connecting mechanism move a front link and a rear link toward the vehicle front side along an arc whose center is a virtual central point that is set at the vehicle upper side of the seat cushion, and tilt the seat cushion frame downward and rearward. Due thereto, the seatback frame is reclined without changing the relative relationship between the seatback frame and the seat cushion frame, and shifting of the back of the seated person (relative positional offset between the back of the seated person and the seatback) is suppressed.

However, in the vehicle seat of the above-described structure, at the time of reclining the seatback, the legs of the seated person are raised up greatly together with the seat cushion. Therefore, there is the concern that the feet of the seated person will come-up off of the vehicle body floor portion and will become unstable. Further, if the vehicle seat of the above-described structure is the driver's seat, at the time when the seatback is reclined, there is the concern that the legs of the seated person will interfere with the steering wheel or the like.

Due to the above, at the vehicle seat of the above-described structure, problems such as the width of adjusting the reclining being narrow, and the like, arise.

SUMMARY

In view of the above-described circumstances, the present disclosure provides a vehicle seat that can suppress shifting of the back of and raising of the legs of a seated person at the time a seatback is reclined.

A vehicle seat relating to a first aspect of the present disclosure includes: a cushion frame rear portion that structures a rear portion of a frame of a seat cushion, and that is made rotatable around a rear portion shaft, whose axial direction is a seat transverse direction, with respect to a vehicle body floor portion; a cushion frame front portion that structures a front portion of the frame of the seat cushion, and that is connected to the cushion frame rear portion so as to be rotatable around a center fold shaft whose axial direction is the seat transverse direction and that is positioned further toward a seat front side than the rear portion shaft; a seatback frame that stands erect from a rear end side of the cushion frame rear portion, and that structures a frame of a seatback; and a driving mechanism that moves the cushion frame front portion and the cushion frame rear portion relatively in a seat vertical direction between a non-reclining state, in which the cushion frame rear portion extends toward a seat rear side from the cushion frame front portion, and a reclining state, in which the cushion frame rear portion tilts downward and rearward with respect to the cushion frame front portion.

In accordance with the vehicle seat of the first aspect of the present disclosure, the driving mechanism moves the cushion frame front portion and the cushion frame rear portion relatively in the seat vertical direction between the above-described non-reclining state and reclining state. Due to this relative movement, at the time of moving from the above-described non-reclining state to the reclining state, the cushion frame front portion and the cushion frame rear portion rotate relatively around the center fold shaft, and the cushion frame rear portion rotates around the rear portion shaft, and the seatback frame, which stands erect from the rear end side of the cushion frame rear portion, reclines (tilts rearward). At this time, because the cushion frame rear portion is reclined together with the seatback frame around the center fold shaft, shifting of the back of the seated person can be suppressed. Moreover, at the time of the above-described reclining, the cushion frame rear portion is rotated around the center fold shaft with respect to the cushion frame front portion and is tilted downward and rearward. Therefore, raising of the legs of the seated person can be suppressed as compared with a case in which the cushion frame front portion is rotated (raised) together with the cushion frame rear portion around the rear portion shaft.

In a vehicle seat relating to a second aspect of the present disclosure, in the vehicle seat of the first aspect, the driving mechanism is structured to include a driving mechanism for reclining that has a link for reclining that is provided between the cushion frame front portion and the vehicle body floor portion, and a motor for reclining that, by driving the link for reclining, moves the cushion frame front portion in the seat vertical direction.

In the vehicle seat of the second aspect of the present disclosure, the link for reclining is provided between the cushion frame front portion and the vehicle body floor portion. Due to the link for reclining being driven by the motor for reclining, the cushion frame front portion is moved in the seat vertical direction. Due thereto, the cushion frame front portion and the cushion frame rear portion can be moved relatively in the seat vertical direction by a simple structure.

In a vehicle seat relating to a third aspect of the present disclosure, in the vehicle seat of the second aspect, the driving mechanism is structured to include a driving mechanism for lifting that has a front link that is provided between the link for reclining and the cushion frame front portion, a rear link that is provided between the cushion frame rear portion and the vehicle body floor portion, and that is connected to the cushion frame rear portion via the rear portion shaft, and a motor for lifting that, by driving at least one of the front link and the rear link, moves the cushion frame front portion and the cushion frame rear portion in the seat vertical direction.

In the vehicle seat of the third aspect of the present disclosure, the front link is provided between the above-described link for reclining and the cushion frame front portion, and the rear link is provided between the cushion frame rear portion and the vehicle body floor portion. This rear link is connected to the cushion frame rear portion via the above-described rear portion shaft. Due to at least one of the front link and the rear link being driven by the motor for lifting, the cushion frame front portion and the cushion frame rear portion are moved in the seat vertical direction. Due thereto, a lifting function can be added by a simple structure.

In a vehicle seat relating to a fourth aspect of the present disclosure, in the vehicle seat of the second or third aspect, the driving mechanism is structured to include a driving mechanism for tilting that rotates the cushion frame front portion and the cushion frame rear portion relatively around the center fold shaft by driving force of a motor for tilting.

The vehicle seat of the fourth aspect of the present disclosure has the above-described driving mechanism for tilting. Therefore, at the time of the above-described reclining, it is easy to rotate the cushion frame front portion and the cushion frame rear portion relatively around the center fold shaft as has been set.

In a vehicle seat relating to a fifth aspect of the present disclosure, in the vehicle seat of any one of the first through fourth aspects, the cushion frame rear portion and the seatback frame are connected integrally.

In the vehicle seat of the fifth aspect of the present disclosure, the cushion frame rear portion and the seatback frame are connected integrally. Therefore, the number of parts and the number of processes of assembling the parts can be reduced.

As described above, the vehicle seat relating to the present disclosure has the excellent effect of being able to suppress shifting of the back of and raising of the legs of a seated person at the time a seatback is reclined.

BRIEF DESCRIPTION OF THE DRAWINGS

Exemplary embodiments of the present disclosure will be described in detail based on the following figures, wherein:

FIG. 10 is a block drawing showing a control system of the vehicle seat;

DETAILED DESCRIPTION

Figure 1:
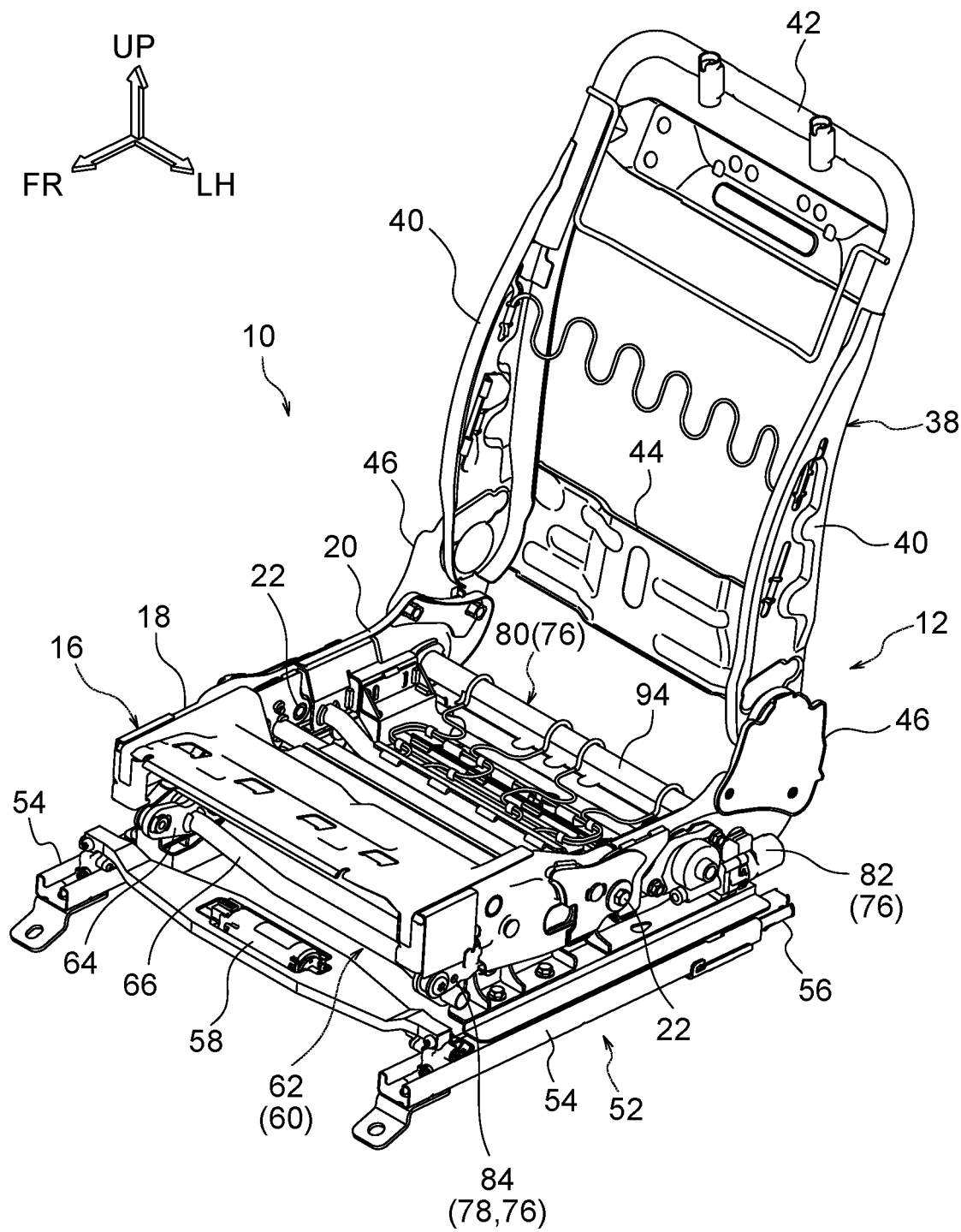
FIG. 1 is a perspective view showing the structure of main portions, including a seat frame, of a vehicle seat relating to an embodiment of the present disclosure.

A vehicle seat 10 relating to an embodiment of the present disclosure is described hereinafter by using FIG. 1 through FIG. 11B. Note that, in the respective drawings, there are cases in which some of the reference numerals are omitted in order to make the drawings easier to view. Further, arrows FR, UP and LH that are shown appropriately in the respective drawings indicate the front side, the upper side and the left side of the vehicle seat 10, respectively. The longitudinal direction, the left-right direction (transverse direction) and the vertical direction of the vehicle seat 10 coincide with the longitudinal direction, the left-right direction (transverse direction) and the vertical direction of the vehicle (the automobile) in which the vehicle seat 10 is installed. Hereinafter, when description is given by using merely longitudinal, left-right and vertical directions, they refer to the directions with respect to the vehicle seat 10, unless otherwise indicated.

As shown in FIG. 1 through FIG. 6, the vehicle seat 10 has a seat frame 12, a seat sliding mechanism 52, a driving mechanism 60 for reclining, a driving mechanism 76 for lifting, and a driving mechanism 102 for tilting. Further, this vehicle seat 10 has an ECU 120 (see FIG. 10) that serves as a control device that controls the operations of the above-described respective mechanisms 52, 60, 76, 102. The driving mechanism 60 for reclining, the driving mechanism 76 for lifting, and the driving mechanism 102 for tilting structure the "driving mechanisms" of the present disclosure.

Figure 7:
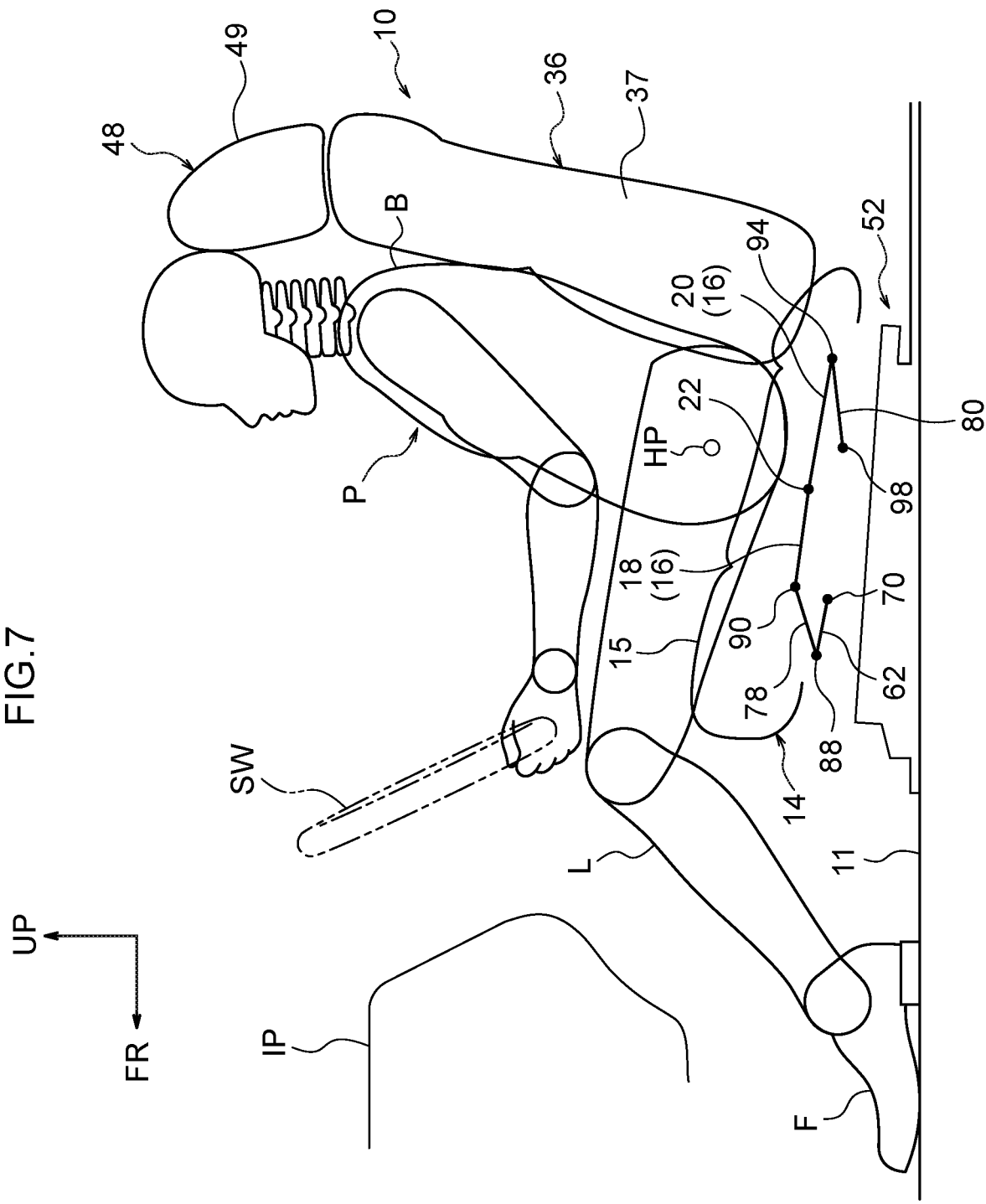
FIG. 7 is a side view showing the non-reclining state and the lowered state of the vehicle seat.
Figure 8:
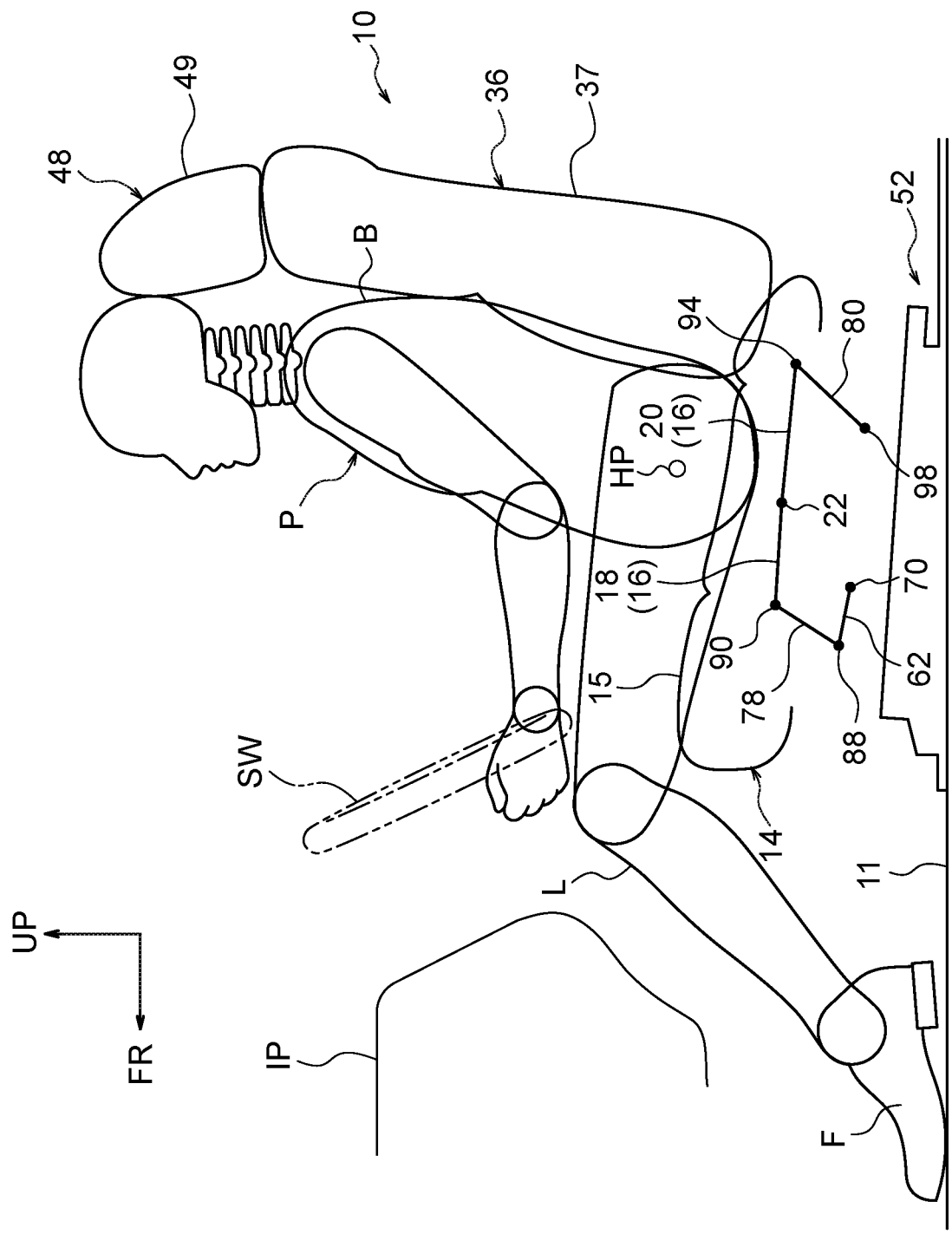
FIG. 8 is a side view showing the non-reclining state and the lifted-up state of the vehicle seat.
Figure 9:
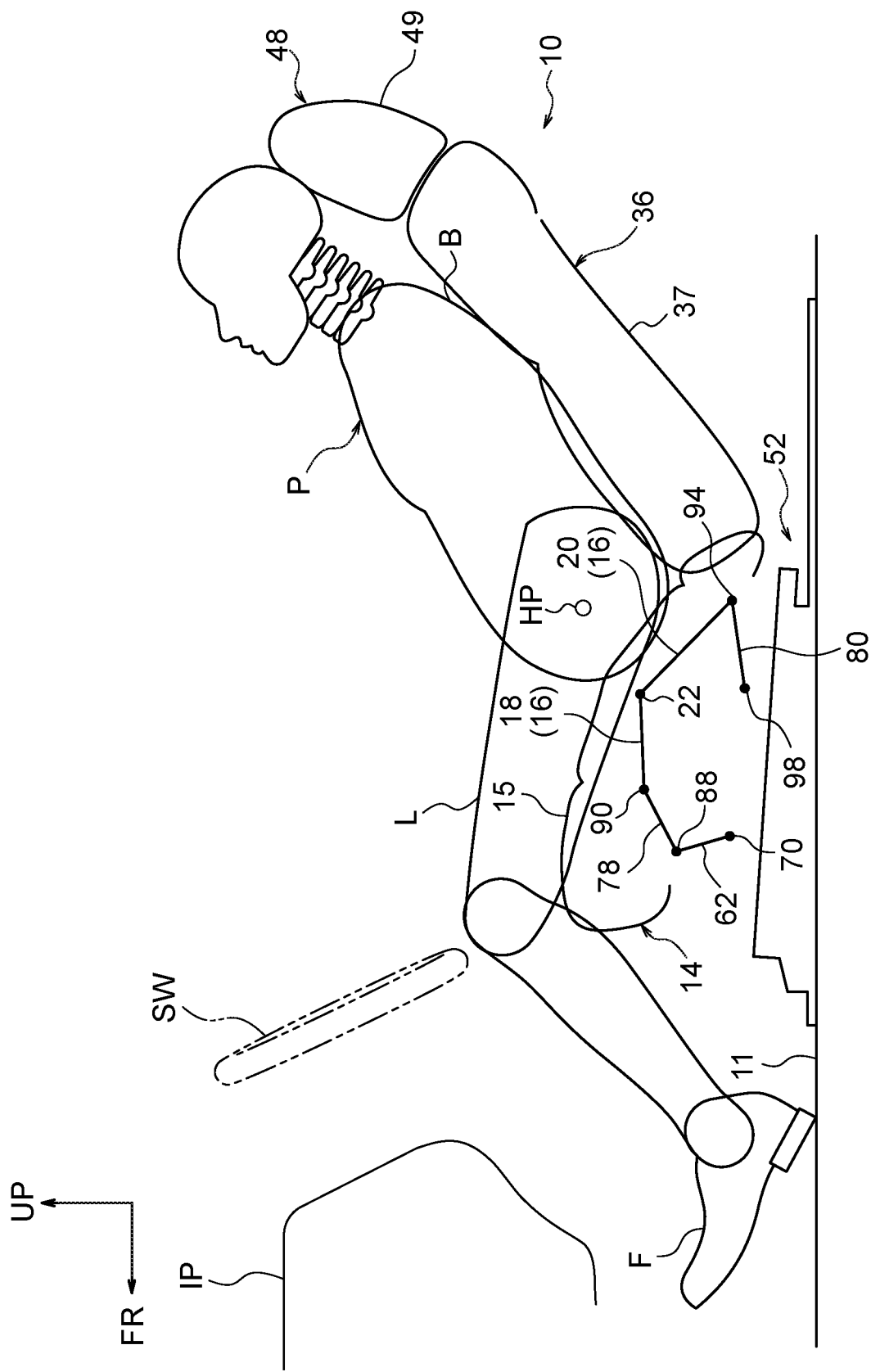
FIG. 9 is a side view showing the reclining state of the vehicle seat.

The seat frame 12 is structured to include a seat cushion frame 16 that structures the frame of a seat cushion 14 (see FIG. 7 through FIG. 9), a seatback frame 38 that structures the frame of a seatback 36 (see FIG. 7 through FIG. 9), and a headrest frame 59 (shown only in FIG. 11A and FIG. 11B) that structures the frame of a headrest 48 (see FIG. 7 through FIG. 9). Unillustrated pads, which are covered by skins 15, 37, 49 (shown only in FIG. 7 through FIG. 9), are mounted to the seat cushion frame 16, the seatback frame 38, and the headrest frame 59, respectively. Note that a seated person P who is shown in FIG. 7 through FIG. 9 and FIG. 11A and FIG. 11B is, for example, an AM 50 (50th percentile U.S. adult male) dummy mannequin. Further, in FIG. 7 through FIG. 9, SW is the steering wheel of the vehicle, and IP is the instrument panel of the vehicle. The aforementioned respective structural elements are described in detail hereinafter.

Seat Cushion Frame 16

The seat cushion frame 16 is structured by a cushion frame front portion 18, which structures the front portion of the frame of the seat cushion 14, and a cushion frame rear portion 20, which structures the rear portion of the frame of the seat cushion 14, being rotatably connected via left and right stepped bolts 22.

The cushion frame front portion 18 has left and right side frame portions 24, a front frame portion 26 that spans between the upper end portions of the front portions of the left and right side frame portions 24, and a pipe frame portion 28 that spans between the rear end portions of the left and right side frame portions 24. The left and right side frame portions 24 and the front frame portion 26 are structured by metal plates for example, and the pipe frame portion 28 is structured by a metal pipe for example.

The cushion frame rear portion 20 has left and right side frame portions 30, a pipe frame portion 32 that spans between the front end portions of the left and right side frame portions 30, and a lower frame portion 34 that spans between the left and right side frame portions 30 at the rear of the pipe frame portion 32. The left and right side frame portions 30 are structured by metal plates for example. The pipe frame portion 32 is structured by a metal pipe for example. The lower frame portion 34 is structured by combining a metal plate and a metal pipe for example.

Figure 11A:
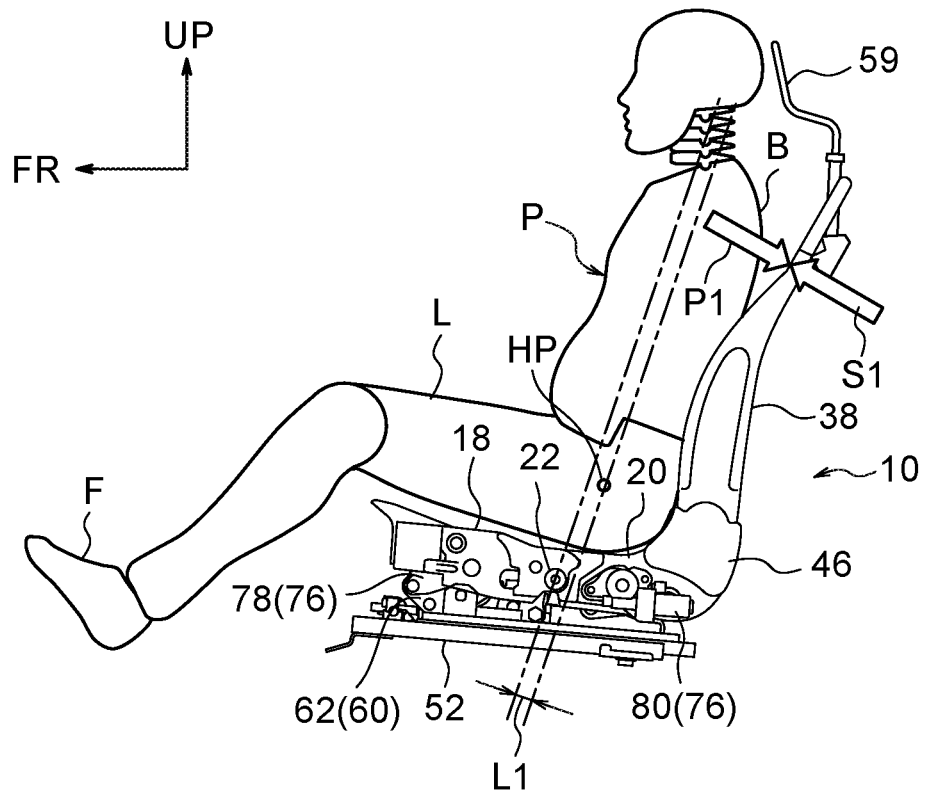
FIG. 11A is a side view showing the non-reclining state and the lowered state of the seat frame.

The rear end portions of the left and right side frame portions 24 of the cushion frame front portion 18 are superposed, from the seat transverse direction outer sides, onto the front end portions of the left and right side frame portions 30 of the cushion frame rear portion 20. Further, the left and right stepped bolts 22, which pass-through the rear end portions of the left and right side frame portions 24 and the front end portions of the left and right side frame portions 30, are screwed-together with unillustrated nuts. Due thereto, the cushion frame front portion 18 and the cushion frame rear portion 20 are connected so as to be rotatable relative to one another around the left and right stepped bolts 22. The axial directions of the left and right stepped bolts 22 are the seat transverse direction, and the stepped bolts 22 are disposed coaxially. In the present embodiment, as shown in FIG. 11A, difference (positional offset) L1 between the positions, in the seatback longitudinal direction, of the left and right stepped bolts 22 and a hip point HP of the seated person P is set to be small. Note that the aforementioned seatback longitudinal direction is the direction orthogonal to the torso line of the seated person P, as seen in a side view of the seat. The left and right stepped bolts 22 correspond to the "center fold shaft" in the present disclosure. Hereinafter, the stepped bolts 22 are called the "center fold shafts 22" upon occasion.

Seatback Frame 38

The seatback frame 38 has left and right side frame portions 40, an upper frame portion 42 that spans between the upper end portions of the left and right side frame portions 40, and a back surface panel portion 44 that spans between the lower end portions of the left and right side frame portions 40. The left and right side frame portions 40 and the back surface panel portion 44 are structured by metal plates for example. The upper frame portion 42 is structured by a metal pipe for example. The headrest frame 59 (see FIG. 11A and FIG. 11B), which structures the frame of the headrest 48 (see FIG. 7 through FIG. 9), is connected to the upper frame portion 42.

The seatback frame 38 of the above-described structure stands erect from the rear end side of the cushion frame rear portion 20. Concretely, left and right B-brackets 46 that are structured by metal plates for example are fixed by a means such as fastening by bolts or the like to the rear end portions of the left and right side frame portions 30 of the cushion frame rear portion 20. The left and right B-brackets 46 extend toward the seat upper side from the rear end portions of the left and right side frame portions 30, and are superposed, from the seat transverse direction outer sides, on the lower end portions of the left and right side frame portions 40 of the seatback frame 38. The left and right side frame portions 40 and the left and right B-brackets 46 are fixed by means such as fastening by bolts or the like. Due thereto, the left and right side frame portions 40 and the left and right side frame portions 30 are fixed via the left and right B-brackets 46.

Seat Sliding Mechanism 52

Figure 2:
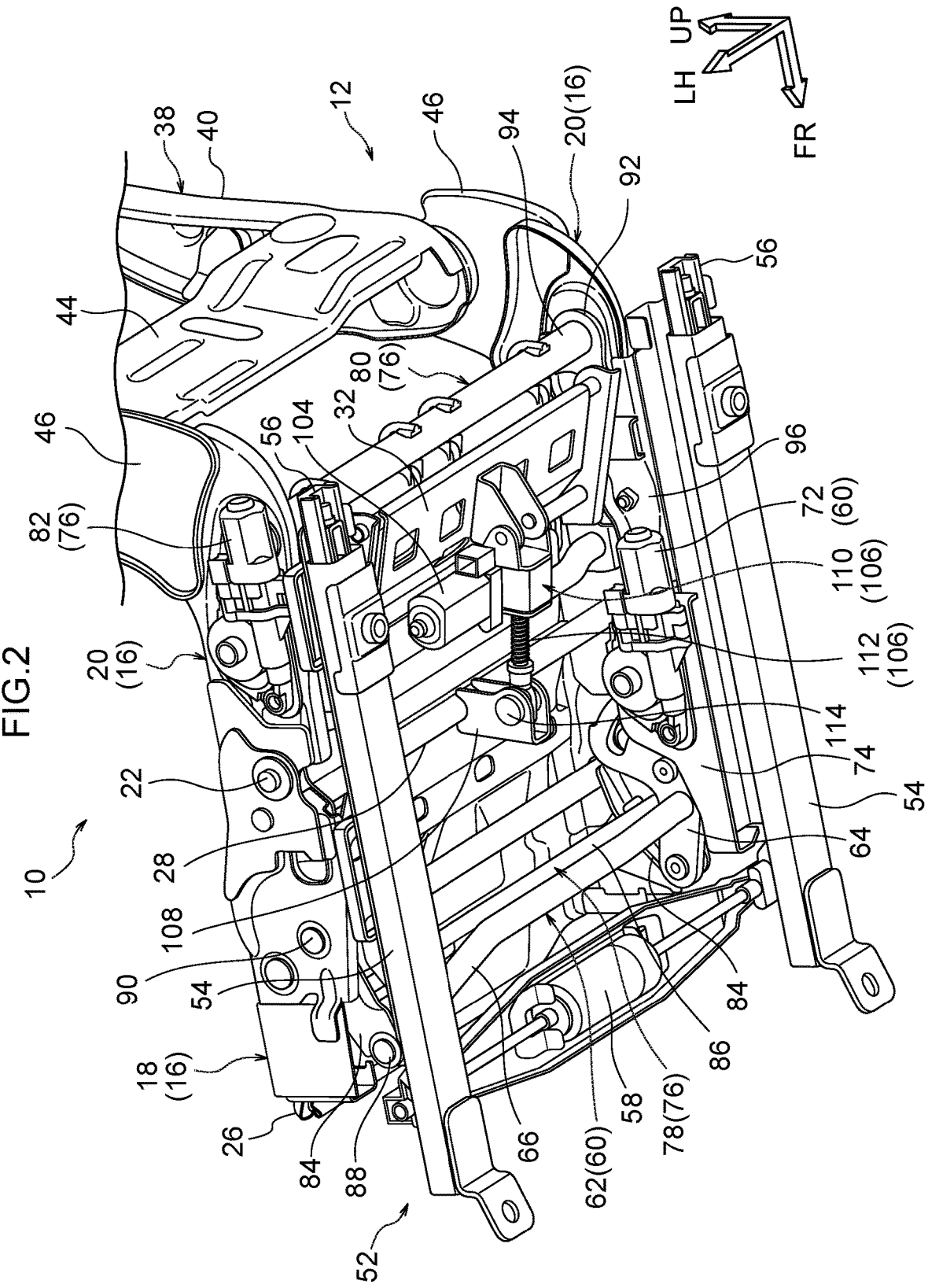
FIG. 2 is a perspective view in which a portion of the structure shown in FIG. 1 is seen from a seat lower side.
Figure 3:
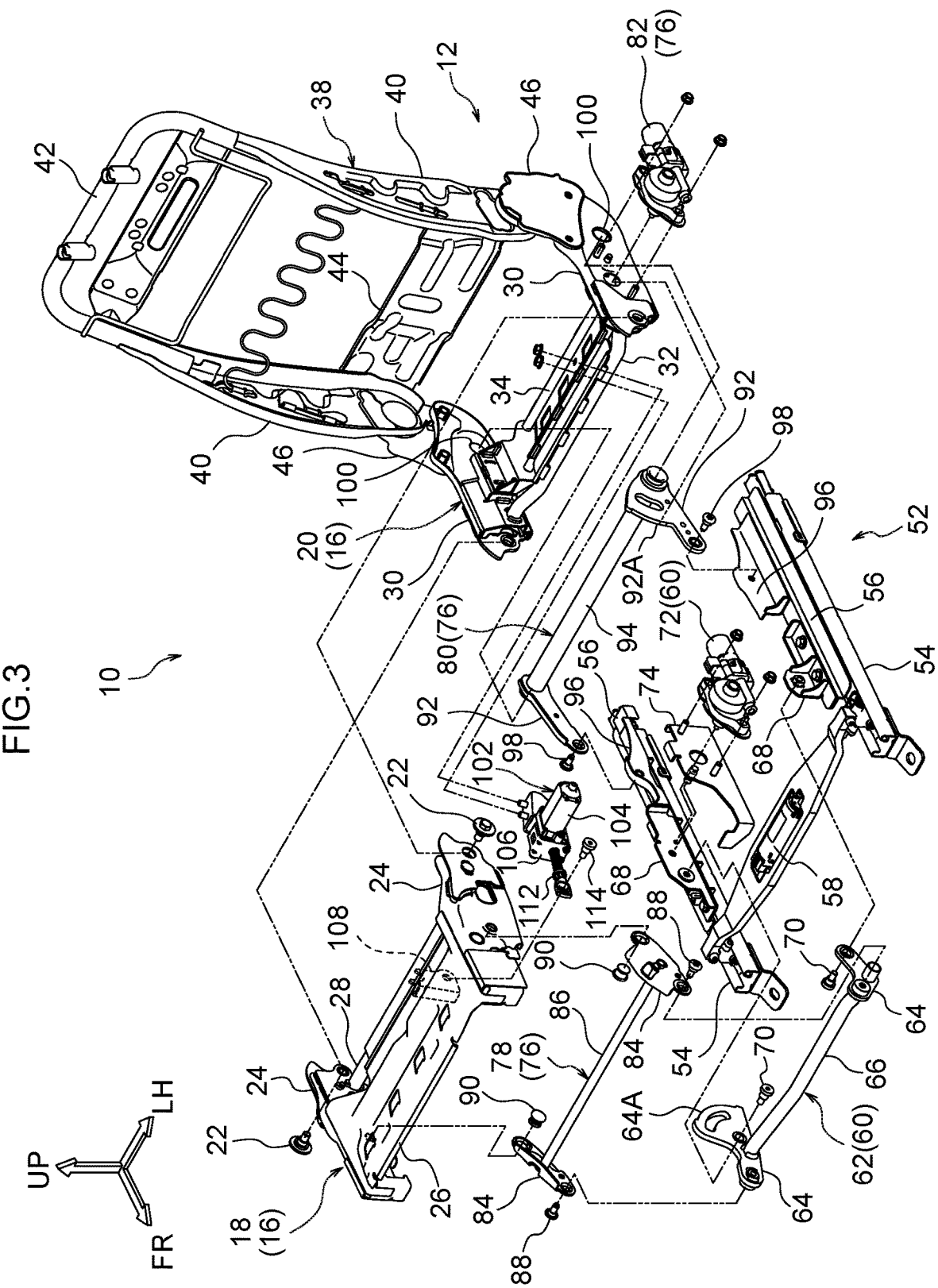
FIG. 3 is an exploded perspective view showing the structure, that is shown in FIG. 1, in a disassembled state.
Figure 4:
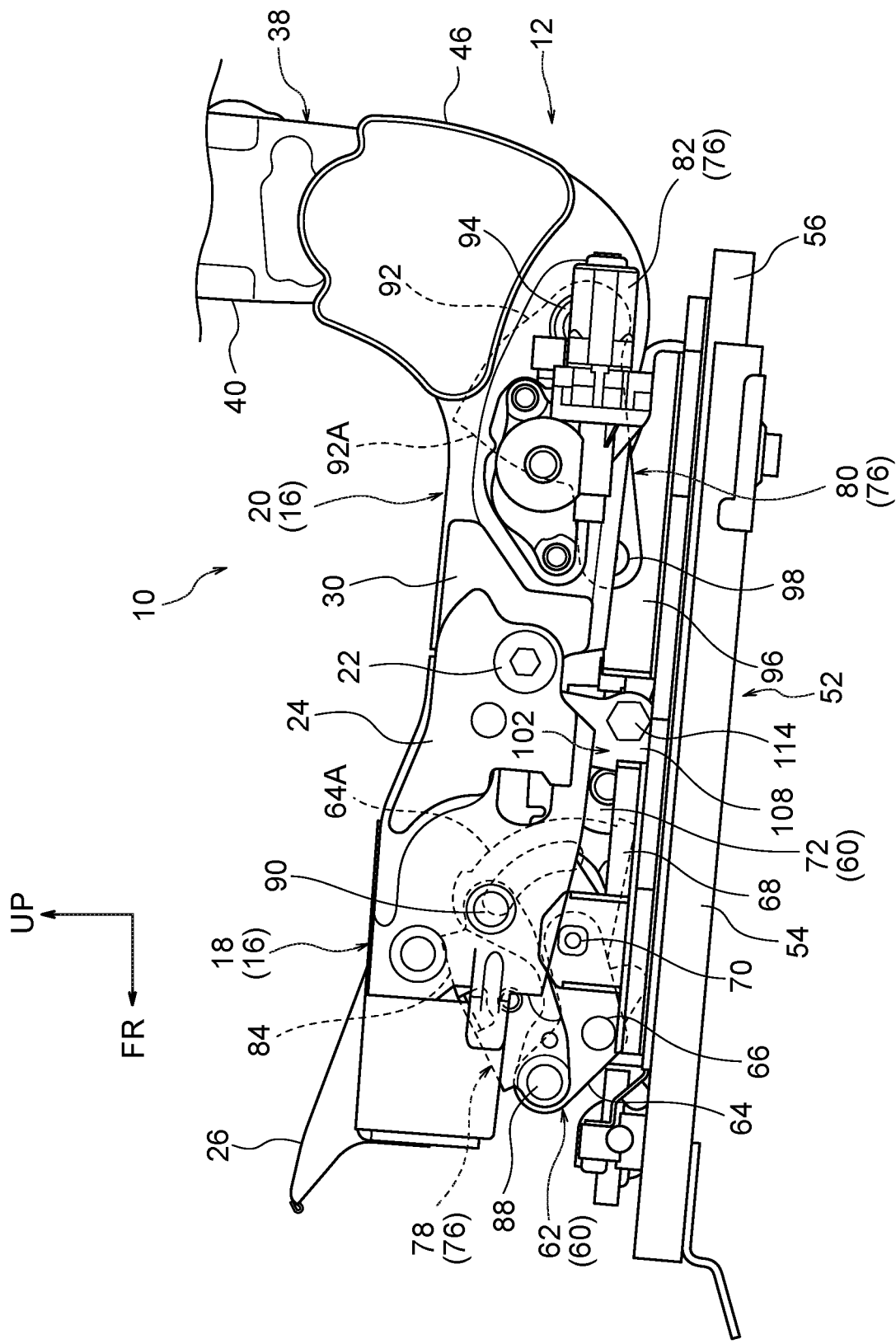
FIG. 4 is a side view showing a portion of the structure shown in FIG. 1, and is a drawing showing a non-reclining state and a lowered state of the seat frame.
Figure 5:
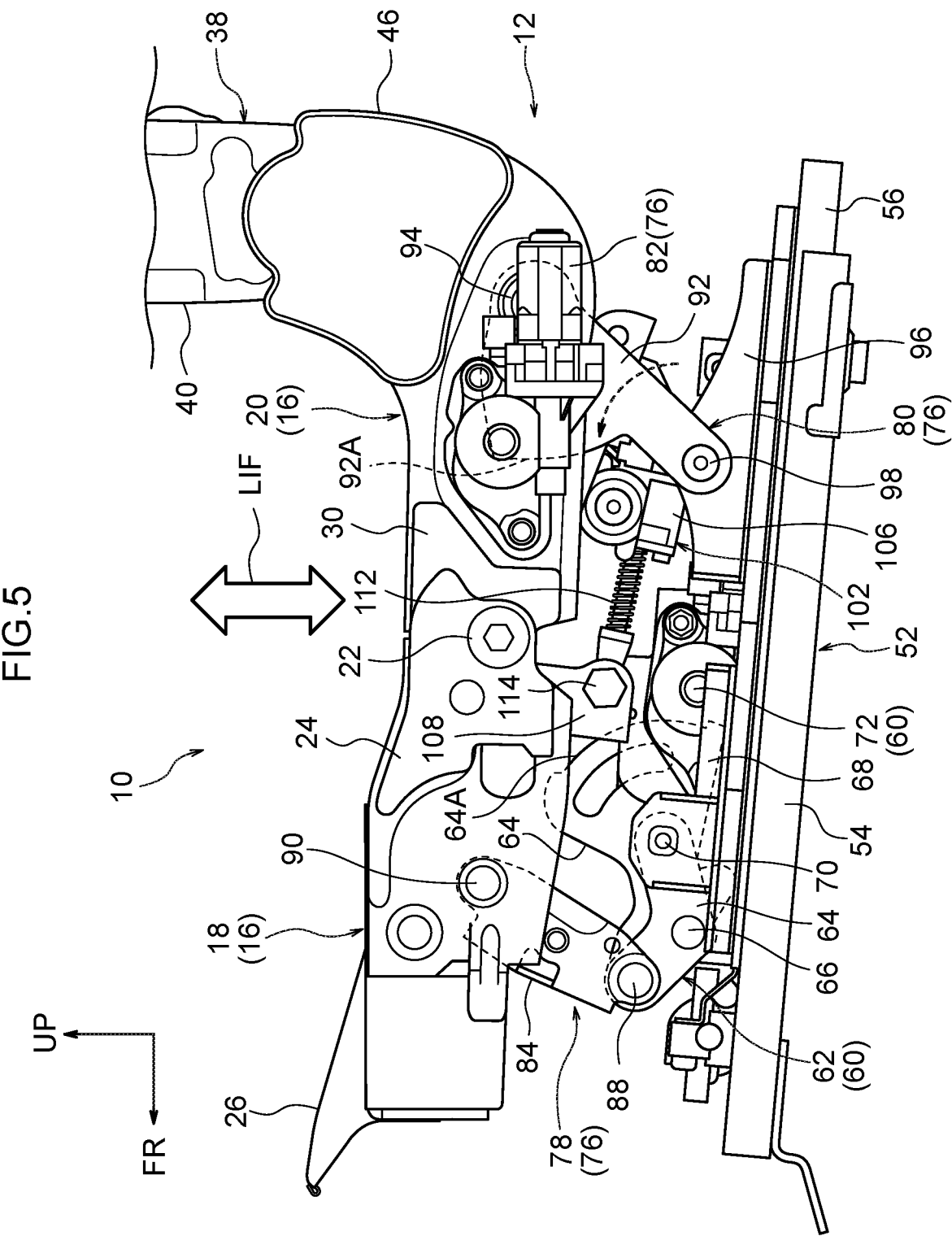
FIG. 5 is a side view that corresponds to FIG. 4 and shows the non-reclining state and a lifted-up state of the seat frame.

The seat sliding mechanism 52 is structured to include left and right lower rails 54 and left and right upper rails 56. The lower rails 54 and the upper rails 56 are structured by metal plates for example, and are formed in elongated shapes that are long in the seat longitudinal direction. The front end portions and the rear end portions of the lower rails 54 are fixed to a vehicle body floor portion 11 (shown only in FIG. 7 through FIG. 9) via front and rear brackets (reference numerals not given thereto). Note that the seat sliding mechanism 52 is illustrated schematically in FIG. 7 through FIG. 9. The upper rails 56 are supported so as to be slidable in the seat longitudinal direction with respect to the lower rails 54. This seat sliding mechanism 52 is structured so as to slide the upper rails 56 in the seat longitudinal direction with respect to the lower rails 54, by the driving force of a motor 58 for sliding that is shown in FIG. 1 through FIG. 3.

Driving Mechanism 60 for Reclining

The driving mechanism 60 for reclining has a link 62 for reclining and a motor 72 for reclining. The link 62 for reclining is structured by left and right link members 64 and a connecting pipe 66 that connects the left and right link members 64 in the seat transverse direction. One end sides of the left and right link members 64 are rotatably connected, via left and right stepped bolts (connecting shaft) 70, to left and right link brackets 68 that are fixed to the front portions of the left and right upper rails 56. The axial directions of the left and right stepped bolts 70 are the seat transverse direction, and the stepped bolts 70 are disposed coaxially. A sector gear 64A is formed integrally with one of the left and right link members 64 (here, the link member 64 at the right side). This sector gear 64A corresponds to the motor 72 for reclining.

The motor 72 for reclining is a motor having a reduction gear, and is fixed to a gear bracket 74 by using bolts and nuts (reference numerals not given thereto). The gear bracket 74 is fixed, by means such as fastening by bolts or the like, to one of the left and right upper rails 56 (here, the upper rail 56 at the right side). A pinion gear (reference numeral not given thereto) is fixed to the output shaft of the motor 72 for reclining. This pinion gear is meshed-together with the sector gear 64A. Due thereto, when the motor 72 for reclining rotates, the link 62 for reclining is rotated around the left and right stepped bolts 70.

Driving Mechanism 76 for Lifting

The driving mechanism 76 for lifting has a front link 78, a rear link 80, and a motor 82 for lifting. The front link 78 is provided between the link 62 for reclining and the cushion frame front portion 18, and is structured by left and right link members 84 and a connecting pipe 86 that connects the left end right link members 84 in the seat transverse direction. One end portions of the left and right link members 84 are rotatably connected, via left and right stepped bolts (connecting shaft) 88, to other end portions of the left and right link members 64 of the link 62 for reclining. The axial directions of the left and right stepped bolts 88 are the seat transverse direction, and the stepped bolts 88 are disposed coaxially.

The other end portions of the left and right link members 84 are rotatably connected, via left and right rivets (connecting shaft) 90, to the left and right side frame portions 24 of the cushion frame front portion 18. The axial directions of the left and right rivets 90 are the seat transverse direction, and the rivets 90 are disposed coaxially. The cushion frame front portion 18 is connected to the left and right upper rails 56 via the front link 78 and the link 62 for reclining, and is supported so as to be able to move in the seat vertical direction within a predetermined range with respect to the left and right upper rails 56. The front link 78 and the link 62 for reclining structure a double link.

The rear link 80 is provided between the cushion frame rear portion 20 and the vehicle body floor portion 11 (here, between the cushion frame rear portion 20 and the left and right upper rails 56), and is structured by left and right link members 92 and a connecting pipe 94 that connects the left and right link members 92 in the seat transverse direction. One end portions of the left and right link members 92 are rotatably connected, via left and right stepped bolts (connecting shaft) 98, to left and right link brackets 96 that are fixed to the rear portions of the left and right upper rails 56. The axial directions of the left and right stepped bolts 98 are the seat transverse direction, and the stepped bolts 98 are disposed coaxially. A sector gear 92A is formed integrally with one of the left and right link members 92 (here, the link member 92 at the left side). This sector gear 92A corresponds to the motor 82 for lifting.

The other end portions of the left and right link members 92 are connected to the left and right side frame portions 30 via the connecting pipe 94. Concretely, circular through-holes 100 are formed in the rear portions of the left and right side frame portions 30, and the axial direction both end portions of the connecting pipe 94 are fit-together with these through-holes 100 so as to rotate freely. Displacement of the connecting pipe 94 in the axial direction with respect to the left and right side frame portions 30 is restricted due to, for example, the axial direction both end portions of the connecting pipe 94 being caulked. The cushion frame rear portion 20 is connected to the left and right upper rails 56 via the rear link 80, and is supported at the vehicle body floor portion 11 so as to be rotatable around the connecting pipe 94. The cushion frame rear portion 20 is supported so as to be able to move in the seat vertical direction within a predetermined range with respect to the left and right upper rails 56. The connecting pipe 94 corresponds to the "rear portion shaft" in the present disclosure, and is disposed such that the axial direction thereof is the seat transverse direction. Hereinafter, the connecting pipe 94 is called "rear portion shaft 94" upon occasion.

The motor 82 for lifting is a motor having a reduction gear, and is fixed to the side frame portion 30 at the left side by using bolts and nuts (reference numerals not given thereto). A pinion gear (reference numeral not given thereto) is fixed to the output shaft of the motor 82 for lifting. This pinion gear is meshed-together with the sector gear 92A. Due thereto, when the motor 82 for lifting rotates, the rear link 80 is rotated around the left and right stepped bolts 98, and the cushion frame rear portion 20 is moved in the seat vertical direction. The rear link 80 structures a single link.

Driving Mechanism 102 for Tilting

The driving mechanism 102 for tilting has a motor 104 for tilting, a feed screw mechanism 106 that is driven by the motor 104 for tilting, and a connecting bracket 108 that is fixed to the pipe frame portion 28 of the cushion frame front portion 18. The motor 104 for tilting and the feed screw mechanism 106 are disposed beneath the lower frame portion 34 of the cushion frame rear portion 20, in a vicinity of the seat transverse direction central portion. The feed screw mechanism 106 has a housing 110 (reference numeral shown only in FIG. 2) that is fixed to the lower frame portion 34 by using bolts and nuts (not shown), and a rod 112 that is supported at the housing 110 so as to be able to move in the seat longitudinal direction. The motor 104 for tilting is fixed to the housing 110 by means such as fastening by screws or the like. The motor 104 for tilting is disposed in an attitude in which the unillustrated output shaft thereof runs along the seat transverse direction.

The rod 112 is formed in the shape of an elongated bar that is long in the seat longitudinal direction, and the rear portion side thereof passes-through the housing 110 in the seat longitudinal direction. A male screw portion (not illustrated), at whose outer periphery a male screw is formed, is provided at the rear portion side of the rod 112. A rotating body (not illustrated), at whose inner periphery a female screw is formed, is provided within the housing 110 so as to correspond to the male screw portion. The male screw portion is screwed-together with the female screw of the rotating body. Due to this rotating body being rotated by the motor 104 for tilting, the rod 112 is moved in the seat longitudinal direction relative to the housing 110.

The front end portion of the rod 112 is disposed beneath the pipe frame portion 28 of the cushion frame front portion 18. The connecting bracket 108 is disposed beneath the pipe frame portion 28. The connecting bracket 108 is formed by a metal plate being press-molded for example, and, as seen in a seat plan view, is formed in a substantial U-shape in cross-section whose seat rear side is open. The upper end portion of the connecting bracket 108 is fixed to the pipe frame portion 28 by means such as welding or the like for example. The front end portion of the rod 112 is rotatably connected to the connecting bracket 108 via a stepped bolt (connecting shaft) 114 whose axial direction is the seat transverse direction. Due thereto, when the rod 112 is moved in the seat longitudinal direction by the motor 104 for tilting, the cushion frame front portion 18 and the cushion frame rear portion 20 are rotated relatively around the left and right center fold shafts 22.

ECU 120

The ECU (Electronic Control Unit) 120 that is shown in FIG. 10 is structured by a microcomputer at which a CPU, a ROM, a RAM and an I/O (input/output interface) are connected to a bus. The above-described motor 58 for sliding, motor 72 for reclining, motor 82 for lifting, and motor 104 for tilting are electrically connected to the I/O of the ECU 120. For example, encoders, which detect the rotational positions of the output shafts of the motors 58, 72, 82, 104, are provided at these motors 58, 72, 82, 104.

Further, an operation portion 122 that is provided at a side surface or the like of the seat cushion 14 is electrically connected to the I/O of the ECU 120. A switch 124 for sliding, a switch 126 for reclining, a switch 128 for lifting, and a switch 130 for tilting are provided at this operation portion 122. The ECU 120 controls the operations of the above-described respective motors 58, 72, 82, 104 in accordance with the operations of these switches 124, 126, 128, 130.

Concretely, when the switch 124 for sliding is operated, the ECU 120 operates the motor 58 for sliding, and moves the left and right upper rails 56 in the seat longitudinal direction with respect to the left and right lower rails 54. Due thereto, the seat frame 12 is moved (slid) between a frontmost position (not illustrated), which is the front end position of the range of longitudinal direction movement with respect to the vehicle body floor portion 11, and a rearmost position (not illustrated), which is the rear end position of the sliding range with respect to the vehicle body floor portion 11.

Further, when the switch 128 for lifting is operated, the ECU 120 operates the motor 82 for lifting, and rotates the rear link 80. This rear link 80 rotates as the driving link of a four-point link mechanism, and the front link 78 rotates as a driven link of the four-point link mechanism. Due thereto, the seat frame 12 is moved (refer to arrow LIF in FIG. 5) up and down between a lowermost position (see FIG. 4 and FIG. 7), which is the lower end position of the range of vertical direction movement with respect to the vehicle body floor portion 11, and an uppermost position which is the upper end position of the range of vertical direction movement with respect to the vehicle body floor portion 11. Note that, in FIG. 7 through FIG. 9, the cushion frame front portion 18, the cushion frame rear portion 20, the respective links 62, 78, 80, the center fold shafts 22, the rear portion shaft 94 and the like are illustrated schematically in order to make it easy to understand the movements of the seat cushion frame 16 and the respective links 62, 78, 80.

Further, when the switch 130 for tilting is operated, the ECU 120 operates the motor 72 for reclining, the motor 82 for lifting and the motor 104 for tilting, and rotates the cushion frame front portion 18 around the center fold shafts 22 relative to the cushion frame rear portion 20. Due thereto, the cushion frame front portion 18 is moved up and down between a non-tilted position (not illustrated) of extending toward the seat front side from the cushion frame rear portion 20, and a tilted position (not illustrated) of being tilted frontward and downward with respect to the cushion frame rear portion 20.

Further, when the switch 126 for reclining is operated, the ECU 120 operates the motor 72 for reclining, the motor 82 for lifting, and the motor 104 for tilting, and rotates the cushion frame front portion 18 and the cushion frame rear portion 20 relatively around the center fold shafts 22 (folds the cushion frame front portion 18 and the cushion frame rear portion 20 in the middle). Due thereto, the cushion frame rear portion 20 is moved up and down between a non-reclining position (see FIG. 4, FIG. 5, FIG. 7, FIG. 8, FIG. 11A) of extending toward the seat rear side from the cushion frame front portion 18, and a reclining position (see FIG. 6, FIG. 9, FIG. 11B) of being tilted rearward and downward with respect to the cushion frame front portion 18.

In this case, the seatback frame 38, which is fixed integrally to the cushion frame rear portion 20, is reclined (tilted rearward) integrally with the cushion frame rear portion 20. The seatback frame 38 is fixed to the cushion frame rear portion 20 such that, in the state in which the cushion frame rear portion 20 is positioned at the non-reclining position, the seatback frame 38 extends at an incline toward the seat upper side and slightly toward the seat rear side from the rear end side of the cushion frame rear portion 20. Due to the cushion frame rear portion 20 being moved between the non-reclining position and the reclining position, the seatback frame 38 tilts in the seat longitudinal direction (refer to arrow REC in FIG. 6). The state in which the cushion frame rear portion 20 is positioned at the above-described non-reclining position corresponds to the "non-reclining state" in the present disclosure, and the state in which the cushion frame rear portion 20 is positioned at the above-described reclining position corresponds to the "reclining state" in the present disclosure.

Further, in the present embodiment, at the time when the switch 126 for reclining is operated with the seat frame 12 being in the non-reclining state and in a state of being positioned further toward the lowermost position side than the uppermost position, the ECU 120 first operates the motor 82 for lifting, and moves the seat frame 12 to the uppermost position. Next, the ECU 120 operates the motor 72 for reclining, the motor 82 for lifting and the motor 104 for tilting, and moves the cushion frame rear portion 20 from the non-reclining position to the reclining position. Due thereto, at the time when the cushion frame rear portion 20 is moved to the reclining position, the cushion frame rear portion 20 is prevented from interfering with the left and right seat sliding mechanisms 52 and the like.

Note that it is also possible for there to be a structure in which, even in the state in which the seat frame 12 is positioned at the lowermost position, the cushion frame rear portion 20 can move to the reclining position without interfering with the seat sliding mechanism 52 and the like. In this case, the order of the operations of the above-described respective motors 72, 82, 104 at the time when the switch 126 for reclining is operated is not limited to the above-described order. For example, there may be a structure in which the ECU 120 operates the above-described respective motors 72, 82, 104 simultaneously. Further, there may be a structure in which operation of the motor 82 for lifting is omitted in a case in which, for example, the position of the seat cushion frame 16 with respect to the seat sliding mechanism 52 (the vehicle body floor portion 11) is set to be high.

Operation and Effects

Operation and effects of the present embodiment are described next.

Figure 6:
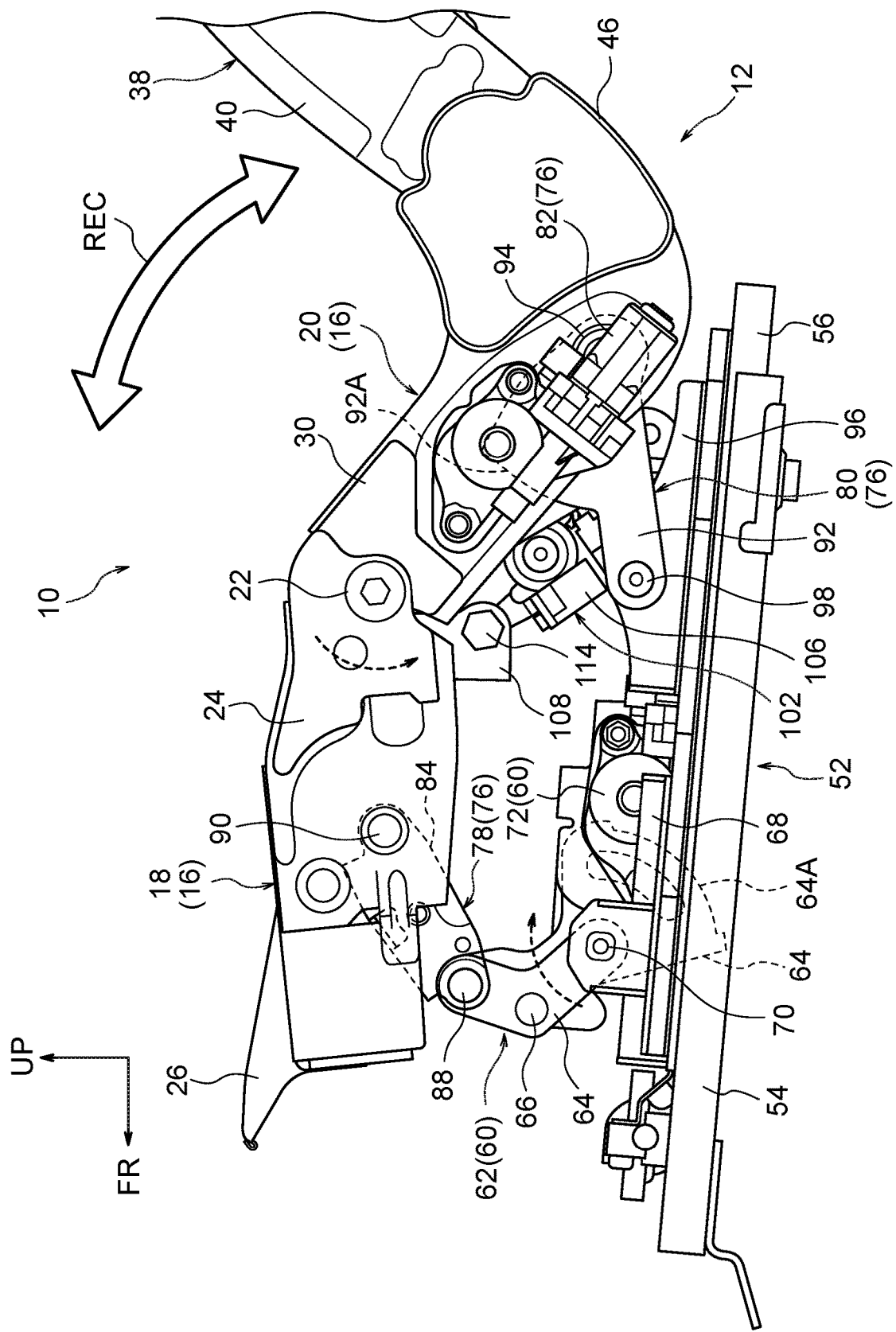
FIG. 6 is a side view that corresponds to FIG. 4 and FIG. 5 and shows a reclining state of the seat frame.
Figure 11B:
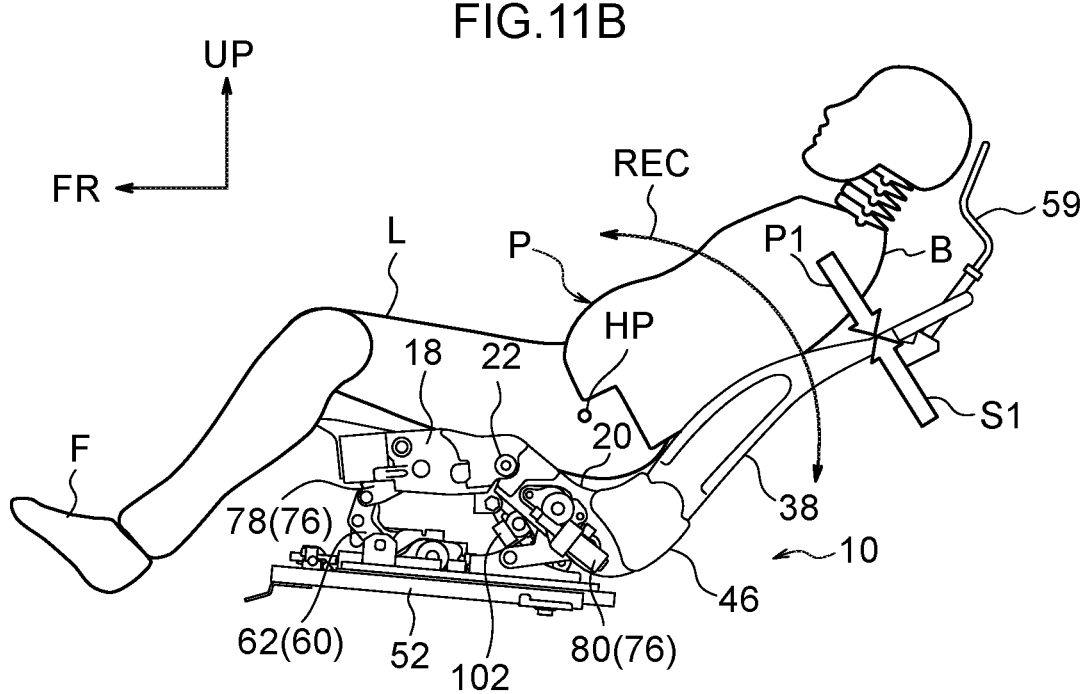
FIG. 11B is a side view showing the reclining state of the seat frame.

In the vehicle seat 10 of the above-described structure, when the switch 126 for reclining is operated, the ECU 120 operates the motor 72 for reclining, the motor 82 for lifting and the motor 104 for tilting. Due thereto, the cushion frame front portion 18 and the cushion frame rear portion 20 are moved relatively (rotated relatively) in the seat vertical direction between the non-reclining state that is shown in FIG. 4, FIG. 5, FIG. 7, FIG. 8 and FIG. 11A and the reclining state that is shown in FIG. 6, FIG. 9 and FIG. 11B. Due to this relative movement, at the time of moving from the above-described non-reclining state to the reclining state, the cushion frame front portion 18 and the cushion frame rear portion 20 rotate relatively around the center fold shafts 22, and the cushion frame rear portion 20 rotates around the rear portion shaft 94, and the seatback frame 38, that stands erect from the rear end side of the cushion frame rear portion 20, reclines. At this time, the cushion frame rear portion 20 is rotated around the center fold shafts 22 together with the seatback frame 38. Therefore, back B of the seated person P becoming positionally offset upward or downward with respect to the seatback 36 (shifting of the back of the seated person P) can be suppressed.

Namely, in the present embodiment, the seatback frame 38 is reclined together with the cushion frame rear portion 20, with the center fold shafts 22, which are disposed in a vicinity of the longitudinal direction central portion of the seat cushion frame 16, being the center of rotation (the hinge center). Due thereto, the offset between the hip point HP of the seated person P and the rotational center of the seatback 36 (the seatback frame 38) is small (see FIG. 11A and FIG. 11B). As a result, relative positional offset between the back B of the seated person P and the seatback 36 can be prevented or suppressed (refer to arrows P1, S1 in FIG. 11A and FIG. 11B). Therefore, comfortable changes in posture can be provided without imparting an uncomfortable feeling due to shifting of the back to the seated person P.

Figure 12A:
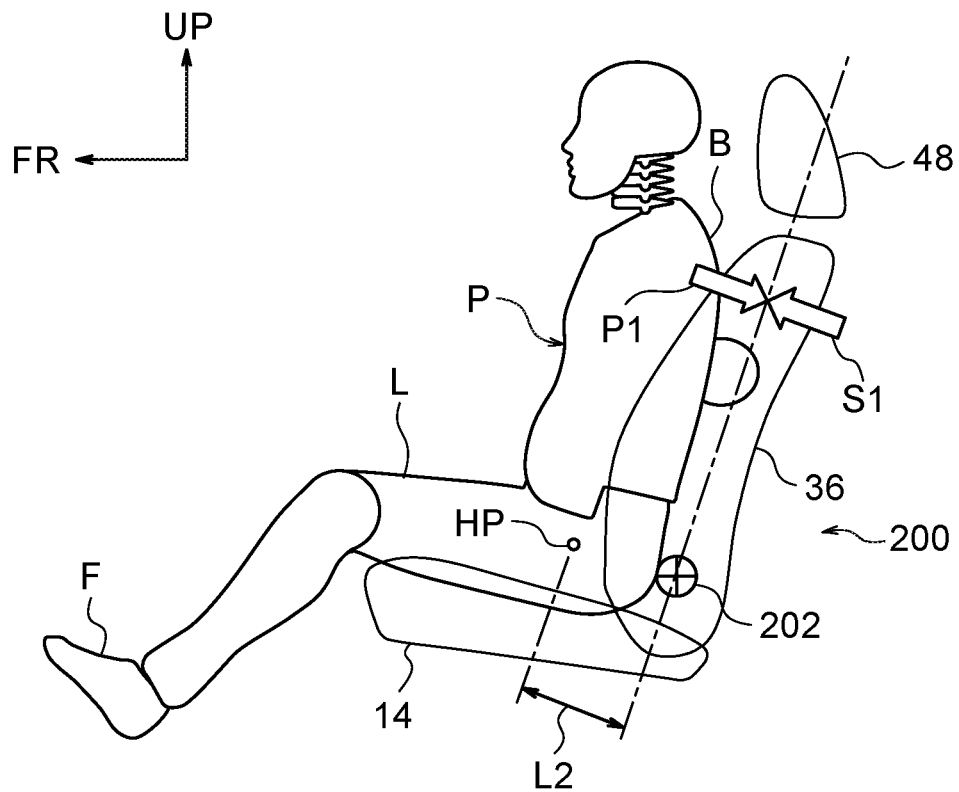
FIG. 12A is a side view showing a non-reclining state of a vehicle seat relating to a comparative example.
Figure 12B:
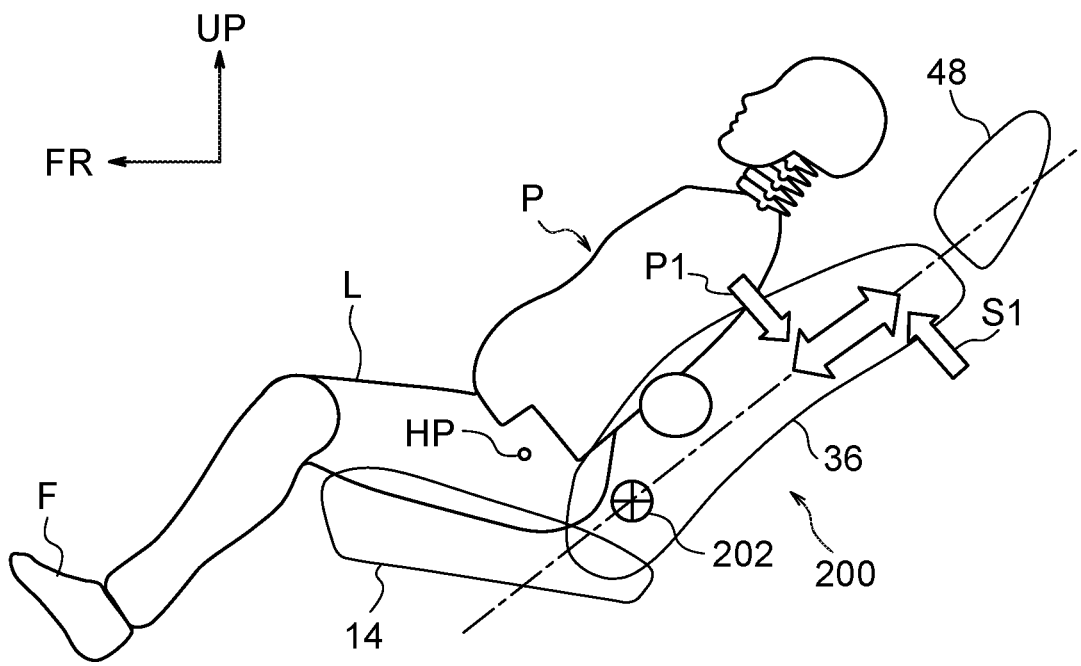
FIG. 12B is a side view showing a reclining state of the vehicle seat relating to the comparative example.

The above-described effects are further described by using a vehicle seat 200 (a comparative example) that is shown in FIG. 12A and FIG. 12B. At this vehicle seat 200, the lower end portion of the seatback 36 is connected to the rear end portion of the seat cushion 14 via a known reclining mechanism 202. At this vehicle seat 200, difference L2 (see FIG. 12A) between the positions, in the seatback longitudinal direction, of the hip point HP of the seated person P and the reclining mechanism 202 that is the center of rotation (the hinge center) of the seatback 36 is set to be large. Therefore, at the time when the seatback 36 is reclined, vertical positional offset arises between the back B of the seated person P and the seatback 36. As a result, for example, the clothes of the seated person P are tugged by friction with the skin 37 of the seatback 36, and the seated person P is made to feel an uncomfortable sensation. However, in the present embodiment, this can be avoided.

Moreover, in the present embodiment, at the time of the above-described reclining, the cushion frame rear portion 20 is rotated around the center fold shafts 22 with respect to the cushion frame front portion 18, and tilts rearward and downward. Therefore, as compared with a case in which the cushion frame front portion 18 is rotated (raised) around the rear portion shaft 94 together with the cushion frame rear portion 20, raising of legs L of the seated person P can be suppressed. As a result, feet F of the seated person P coming-up off of the vehicle body floor portion 11 and becoming unstable can be prevented or suppressed, and the legs L of the seated person P interfering with the steering wheel SW and/or the instrument panel IP and the like can be prevented or suppressed. Due thereto, in the present embodiment, it is easy to set the width of the adjusting of the reclining to be large.

Further, in the present embodiment, the driving mechanism 60 for reclining has the link 62 for reclining that is provided between the cushion frame front portion 18 and the vehicle body floor portion 11, and the motor 72 for reclining that, by driving the link 62 for reclining, moves the cushion frame front portion 18 in the seat vertical direction. Further, due to the link 62 for reclining being driven by the motor 72 for reclining, the cushion frame front portion 18 is moved in the seat vertical direction. Due thereto, the cushion frame front portion 18 and the cushion frame rear portion 20 can be moved relatively in the seat vertical direction by a simple structure.

Further, in the present embodiment, the front link 78 is provided between the link 62 for reclining and the cushion frame front portion 18, and the rear link 80 is provided between the cushion frame rear portion 20 and the vehicle body floor portion. This rear link 80 is connected to the cushion frame rear portion 20 via the rear portion shaft 94. Due to the rear link 80 being driven by the motor 82 for lifting, the cushion frame front portion 18 and the cushion frame rear portion 20 are moved in the seat vertical direction. Due thereto, a lifting function can be added by a simple structure.

Moreover, in the present embodiment, there is provided the driving mechanism for tilting 102 that rotates the cushion frame front portion 18 and the cushion frame rear portion 20 relatively around the center fold shafts 22 by the driving force of the motor 104 for tilting. Therefore, at the time of the above-described reclining, it is easy to rotate the cushion frame front portion 18 and the cushion frame rear portion 20 relatively around the center fold shafts 22 as has been set. Further, because the cushion frame front portion 18 can be rotated (moved vertically) relative to the cushion frame rear portion 20 around the center fold shafts 22, a tilting function can be added by a simple structure.

Further, in the present embodiment, the cushion frame rear portion 20 is a structure that is supported so as to be rotatable around the rear portion shaft 94 with respect to the vehicle body floor portion 11. Therefore, the support rigidity of the cushion frame rear portion 20 with respect to the vehicle body floor portion 11 can be ensured to be good.

Supplemental Description of Embodiment

The above-described embodiment is structured to have the driving mechanism 76 for lifting. However, the present disclosure is not limited to this, and may be structured such that the driving mechanism 76 for lifting is omitted. In this case, there is a structure in which, for example, left and right brackets that are mounted to the top surfaces of the rear portions of the left and right upper rails 56, and the left and right side frames 30 of the cushion frame rear portion 20, are rotatably connected via a rear portion shaft whose axial direction is the seat transverse direction. Further, in this case, there is a structure in which, for example, the other end portions of the left and right link members 64 of the link 62 for reclining are connected to the left and right side frames 24 of the cushion frame front portion 18 so as to be rotatable around an axis that runs along the seat transverse direction. However, in this case, the length dimension of the left and right link members 64, and the like, must be changed.

Further, the above-described embodiment is structured such that the driving mechanism 60 for reclining moves the cushion frame front portion 18 in the seat vertical direction. However, the present disclosure is not limited to this, and may be structured such that an actuator, which serves as the driving mechanism for reclining, moves the cushion frame rear portion in the seat vertical direction. In this case, there may be a structure in which the cushion frame front portion is made to be unable to move in the seat vertical direction with respect to the vehicle body floor portion.

Although the above-described embodiment is structured such that the driving mechanism 102 for tilting has the feed screw mechanism 106, the present disclosure is not limited to this, and the driving mechanism for tilting may be a motor having a reduction gear. In this case, there is a structure in which the cushion frame front portion and the cushion frame rear portion are rotated relatively (are folded in the middle) around the center fold shaft by the driving force of the motor having a reduction gear.

Although the above-described embodiment is structured to include the driving mechanism 102 for tilting, the present disclosure is not limited to this. Namely, for example, in the case of a structure in which, as described above, the cushion frame front portion is made to be unable to move in the seat vertical direction, and on the other hand, the cushion rear portion is moved in the seat vertical direction by an actuator, it is possible to rotate the cushion frame front portion and the cushion frame rear portion relatively around the center fold shaft by only that movement. Therefore, a driving mechanism for tilting is not needed.

Figure 13:
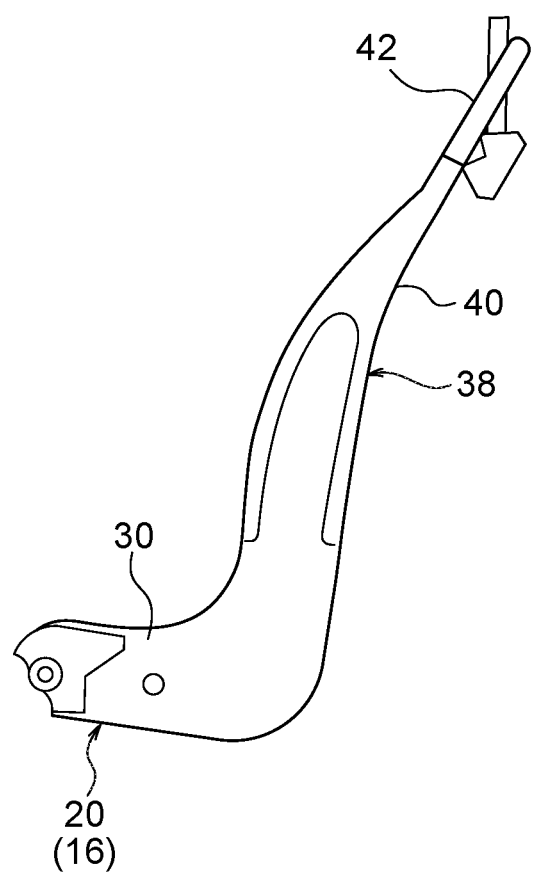
FIG. 13 is a side view showing an example in which the cushion frame rear portion and the seatback frame are connected integrally.

Further, in the above-described embodiment, the cushion frame rear portion 20 and the seatback frame 38 are structured so as to be fixed via the left and right B-brackets 46, but the present disclosure is not limited to this. For example, there may be a structure in which the cushion frame rear portion 20 and the seatback frame 38 are connected via a known reclining mechanism. Due thereto, the deformation modes of the seat frame 12 can be increased. Further, for example, as with the modified example that is shown in FIG. 13, there may be a structure in which the left and right side frame portions 30 of the cushion frame rear portion 20 and the left and right side frame portions 40 of the seatback frame 38 are connected integrally. In this modified example, the side frame 30 and the side frame 40 are molded integrally by a single steel plate. Due thereto, the number of parts and the number of processes of assembling the parts can be reduced.

In addition, the present disclosure can be implemented by being modified in various ways within a scope that does not depart from the gist thereof. Further, the scope of the right of the present disclosure is, of course, not to be limited by the above-described embodiments.

What is claimed is:

1. A vehicle seat comprising:
   a cushion frame rear portion that forms a rear portion of a frame of a seat cushion, and that is rotatable around a rear portion shaft, whose axial direction is a seat transverse direction, with respect to a vehicle body floor portion;
   a cushion frame front portion that forms a front portion of the frame of the seat cushion, and that is connected to the cushion frame rear portion so as to be rotatable around a center fold shaft whose axial direction is the seat transverse direction and that is positioned further toward a seat front side than the rear portion shaft;
   a seatback frame that stands erect from a rear end side of the cushion frame rear portion, and that forms a frame of a seatback; and
   a driving mechanism that moves the seatback frame, the cushion frame front portion, and the cushion frame rear portion together, wherein the driving mechanism moves the cushion frame front portion and the cushion frame rear portion relatively in a seat vertical direction between a non-reclining state, in which the cushion frame rear portion extends toward a seat rear side from the cushion frame front portion, and a reclining state, in which the cushion frame rear portion tilts downward and rearward with respect to the cushion frame front portion, and wherein the driving mechanism reclines the seatback frame as the cushion frame rear portion tilts.

2. The vehicle seat of claim 1, wherein the driving mechanism comprises a driving mechanism for reclining that includes:
   a link for reclining that is provided between the cushion frame front portion and the vehicle body floor portion; and
   a motor for reclining that, by driving the link for reclining, moves the cushion frame front portion in the seat vertical direction.

3. The vehicle seat of claim 2, wherein the driving mechanism comprises a driving mechanism for lifting that includes:
   a front link that is provided between the link for reclining and the cushion frame front portion;
   a rear link that is provided between the cushion frame rear portion and the vehicle body floor portion, and that is connected to the cushion frame rear portion via the rear portion shaft; and
   a motor for lifting that, by driving at least one of the front link and the rear link, moves the cushion frame front portion and the cushion frame rear portion in the seat vertical direction.

4. The vehicle seat of claim 3, wherein the driving mechanism comprises a driving mechanism for tilting that is configured to rotate the cushion frame front portion and the cushion frame rear portion relatively around the center fold shaft by driving force of a motor for tilting.

5. The vehicle seat of claim 2, wherein the driving mechanism comprises a driving mechanism for tilting that is configured to rotate the cushion frame front portion and the cushion frame rear portion relatively around the center fold shaft by driving force of a motor for tilting.

6. The vehicle seat of claim 1, wherein the cushion frame rear portion and the seatback frame are connected integrally.

7. A vehicle seat comprising:
   a cushion frame rear portion that forms a rear portion of a frame of a seat cushion, and that is rotatable around a rear portion shaft, whose axial direction is a seat transverse direction, with respect to a vehicle body floor portion;
   a cushion frame front portion that forms a front portion of the frame of the seat cushion, and that is connected to the cushion frame rear portion so as to be rotatable around a center fold shaft whose axial direction is the seat transverse direction and that is positioned further toward a seat front side than the rear portion shaft;
   a seatback frame that stands erect from a rear end side of the cushion frame rear portion, and that forms a frame of a seatback; and
   a driving mechanism that moves the cushion frame front portion and the cushion frame rear portion relatively in a seat vertical direction between a non-reclining state, in which the cushion frame rear portion extends toward a seat rear side from the cushion frame front portion, and a reclining state, in which the cushion frame rear portion tilts downward and rearward with respect to the cushion frame front portion, wherein the driving mechanism comprises a driving mechanism for reclining that includes:
   a link for reclining that is provided between the cushion frame front portion and the vehicle body floor portion; and
   a motor for reclining that, by driving the link for reclining, moves the cushion frame front portion in the seat vertical direction.

8. The vehicle seat of claim 7, wherein the driving mechanism comprises a driving mechanism for lifting that includes:
   a front link that is provided between the link for reclining and the cushion frame front portion;
   a rear link that is provided between the cushion frame rear portion and the vehicle body floor portion, and that is connected to the cushion frame rear portion via the rear portion shaft; and
   a motor for lifting that, by driving at least one of the front link and the rear link, moves the cushion frame front portion and the cushion frame rear portion in the seat vertical direction.

9. The vehicle seat of claim 8, wherein the driving mechanism comprises a driving mechanism for tilting that is configured to rotate the cushion frame front portion and the cushion frame rear portion relatively around the center fold shaft by driving force of a motor for tilting.

10. The vehicle seat of claim 7, wherein the driving mechanism comprises a driving mechanism for tilting that is configured to rotate the cushion frame front portion and the cushion frame rear portion relatively around the center fold shaft by driving force of a motor for tilting.

* * * * *